US012770899B2

(12) United States Patent
Uratsuka

(10) Patent No.: US 12,770,899 B2
(45) Date of Patent: Oct. 20, 2026

(54) WATER DISCHARGE VALVE SYSTEM

(71) Applicant: AISAN KOGYO KABUSHIKI KAISHA, Obu (JP)

(72) Inventor: Takafumi Uratsuka, Nagoya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 599 days.

(21) Appl. No.: 18/238,031

(22) Filed: Aug. 25, 2023

(65) Prior Publication Data

US 2024/0072276 A1 Feb. 29, 2024

(30) Foreign Application Priority Data

Aug. 31, 2022 (JP) ................................ 2022-137869

(51) Int. Cl.
*H01M 8/04119* (2016.01)
*B60L 58/40* (2019.01)

(52) U.S. Cl.
CPC ......... *H01M 8/04156* (2013.01); *B60L 58/40* (2019.02)

(58) Field of Classification Search
CPC .......................... H01M 8/04156; B60L 58/40
See application file for complete search history.

(56) References Cited

U.S. PATENT DOCUMENTS 9,899,690 B2 2/2018 Naganuma et al.
2007/0196709 A1* 8/2007 Umayahara ....... H01M 8/04432 429/444
2008/0213635 A1* 9/2008 Blaszczyk ......... H01M 8/04761 429/429
2008/0233445 A1* 9/2008 Nakayama ........ H01M 8/04097 429/449
2009/0226783 A1* 9/2009 Hasegawa ......... H01M 8/04291 429/415
2024/0072276 A1* 2/2024 Uratsuka ........... H01M 8/04156

FOREIGN PATENT DOCUMENTS

JP 2005302708 A * 10/2005
JP 2006-185616 A 7/2006
JP 2006-331674 A 12/2006
JP 2007-184199 A 7/2007
JP 2008-059933 A 3/2008

(Continued)

OTHER PUBLICATIONS

Machine Translation of JP-2005302708-A (Apr. 10, 2026) (Year: 2026).*

(Continued)

*Primary Examiner* — Matthew J Merkling
(74) *Attorney, Agent, or Firm* — Jason A. Smith; Shumaker, Loop & Kendrick, LLP

(57) ABSTRACT

A water discharge valve system that may include a gas-liquid separator configured to store water discharged from a fuel cell; a water discharge valve configured to discharge the water stored in the gas-liquid separator outside; and a controller configured to execute open-close control of the water discharge valve, wherein the controller intermittently opens and closes the water discharge valve such that a ratio of a valve-open duration to a valve-closed duration of the water discharge valve decreases as time passes from start of the open-close control.

2 Claims, 2 Drawing Sheets

(56) References Cited

FOREIGN PATENT DOCUMENTS

| | | | | |
|---|---|---|---|---|
| JP | 2008-0846603 | A | | 4/2008 |
| JP | 2008084603 | A | * | 4/2008 |
| JP | 2008-234980 | A | | 10/2008 |
| JP | 2008-243500 | A | | 10/2008 |
| JP | 2016-096058 | A | | 5/2016 |
| JP | 2021-044189 | A | | 3/2021 |

OTHER PUBLICATIONS

Machine translation of JP-2008084603-A (Apr. 10, 2026) (Year: 2026).*

JP Office Action for JP Pat. App. 2002-137869 mailed Aug. 26, 2025 (5 pages total including English translation).

* cited by examiner

WATER DISCHARGE VALVE SYSTEM

REFERENCE TO RELATED APPLICATION

This application claims priority from Japanese Patent Application No. 2022-137869 filed on Aug. 31, 2022. The entire content of the priority application is incorporated herein by reference.

TECHNICAL FIELD

The art disclosed herein relates to a water discharge valve system.

BACKGROUND ART

Japanese Patent Application Publication No. 2006-331674 describes a system including a gas-liquid separator configured to store water discharged from a fuel cell and a water discharge valve configured to discharge the water stored in the gas-liquid separator outside. In the system of Japanese Patent Application Publication No. 2006-331674, there may be cases where the water discharge valve is intermittently opened and closed.

SUMMARY

In the configuration of Japanese Patent Application Publication No. 2006-331674, the intermittent opening and closing of the water discharge valve cause an amount of the stored water in the gas-liquid separator to gradually decrease as time passes. If the valve is simply opened and closed intermittently, this does not effectively discharge the water. Due to this, there is still room for improvement in regards to open-close control of the water discharge valve. The present teachings provide an art configured to effectively discharge water stored in a gas-liquid separator.

In a first aspect of the art disclosed herein, a water discharge valve system may comprise: a gas-liquid separator configured to store water discharged from a fuel cell; a water discharge valve configured to discharge the water stored in the gas-liquid separator outside; and a controller configured to execute open-close control of the water discharge valve, wherein the controller intermittently opens and closes the water discharge valve such that a ratio of a valve-open duration to a valve-closed duration of the water discharge valve decreases as time passes from start of the open-close control.

In open-close control in which a water discharge valve is intermittently opened and closed, the stored water amount decreases because the water stored in the gas-liquid separator is discharged outside as time passes from the start of the open-close control. According to the above configuration, since the ratio of the valve-open duration for the water discharge valve is reduced as the stored water amount decreases, the valve-open duration does not become needlessly long, as a result of which the water stored in the gas-liquid separator can be effectively discharged.

In a second aspect, the controller may shorten the valve-open duration of the water discharge valve and lengthen the valve-closed duration of the water discharge valve as time passes from the start of the open-close control.

According to this configuration, the ratio of the valve-open duration to the valve-closed duration of the water discharge valve can further be reduced. Also, the ratio of the valve-closed duration to the valve-open duration can be increased. Due to this, time during which the water is to accumulate in the gas-liquid separator can be ensured, and a great amount of water can be discharged at once, by which the water can be effectively discharged.

DETAILED DESCRIPTION

Figure 1:
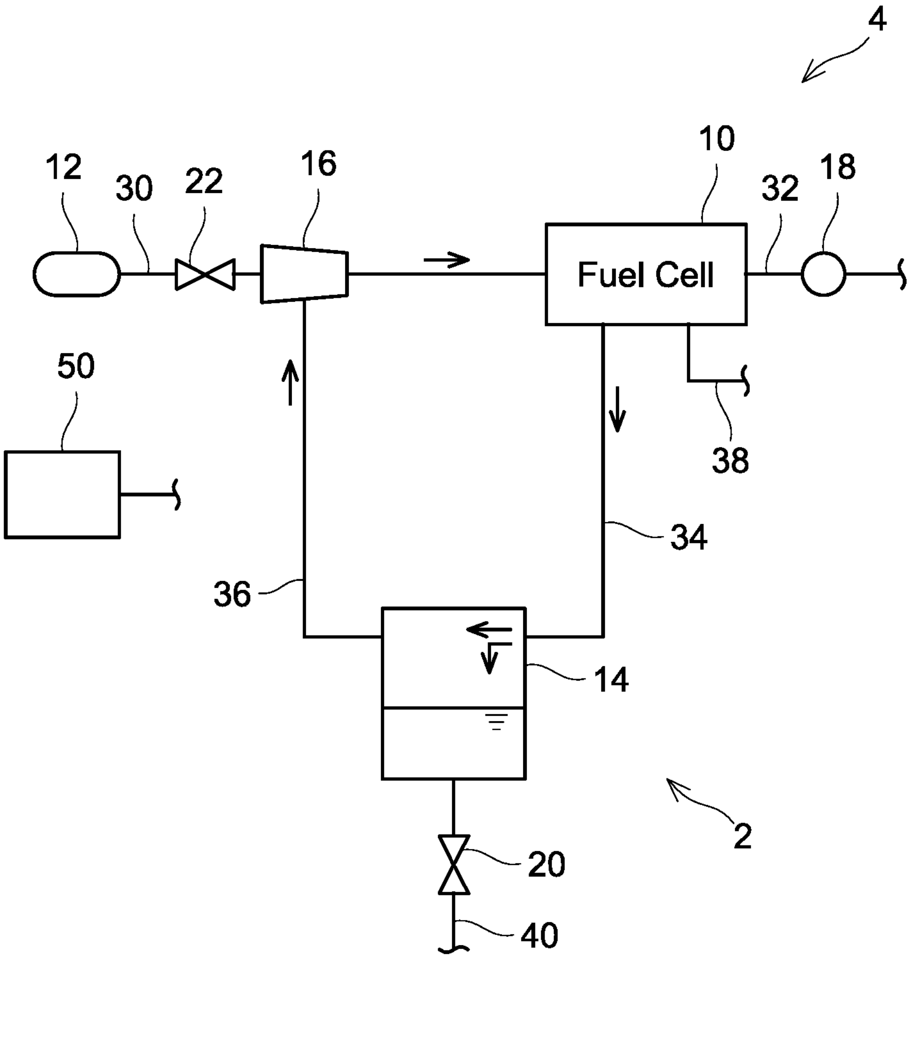
FIG. 1 schematically shows a fuel cell system comprising a water discharge valve system according to an embodiment.

A water discharge valve system 2 according to an embodiment will be described with reference to the drawings. FIG. 1 schematically illustrates a fuel cell system 4 comprising the water discharge valve system 2 according to the embodiment. As illustrated in FIG. 1, the fuel cell system 4 comprises a hydrogen tank 12, a fuel cell 10, a gas-liquid separator 14, and a controller 50. The fuel cell system 4 is mounted in a vehicle (not shown) such as a fuel cell electric vehicle.

The hydrogen tank 12 is configured to store hydrogen gas (fuel gas) to be supplied to the fuel cell 10. The hydrogen tank 12 is connected with a hydrogen supply path 30. The hydrogen supply path 30 has its upstream end connected with the hydrogen tank 12 and its downstream end connected with the fuel cell 10. The hydrogen supply path 30 is configured to supply hydrogen gas from the hydrogen tank 12 to the fuel cell 10.

An electromagnetic valve 22 and an ejector 16 are disposed in the hydrogen supply path 30. The electromagnetic valve 22 is configured to open and close the hydrogen supply path 30. When the electromagnetic valve 22 opens, the hydrogen gas is supplied to the fuel cell 10 through the hydrogen supply path 30. An opening degree of the electromagnetic valve 22 is adjustable.

The ejector 16 is located in the hydrogen supply path 30 that is downstream of the electromagnetic valve 22 (on a fuel cell 10 side). The ejector 16 is connected to a downstream end of a circulation path 36 to be described later. The ejector 16 is instrument for suctioning gas flowing in the circulation path 36 by pressure of the hydrogen gas flowing in the hydrogen supply path 30 and discharging the same to the downstream side in the hydrogen supply path 30.

The fuel cell 10 will be described. The fuel cell 10 is connected to the air supply path 32 in addition to the hydrogen supply path 30. The air supply path 32 has its upstream end connected to a source of air supply (not shown) and its downstream end connected to the fuel cell 10. The fuel cell 10 is supplied with air through the air supply path 32 from the air supply source. The upstream end of the air supply path 32 may be open to outside air. The air supply path 32 comprises a pump 18 configured to deliver air with pressure toward the fuel cell 10.

The fuel cell 10 generates electricity using hydrogen supplied from the hydrogen supply path 30 and oxygen contained in the air supplied from the air supply path 32. The fuel cell 10 comprises a plurality of battery cells (not shown) stacked within a container and each battery cell generates electricity by chemical reaction between hydrogen and oxygen. Although these are not limiting, but the battery cells are for example solid oxide fuel cells (SOFC) or polymer electrolyte fuel cells (PFFC). When power is generated in the fuel cell 10, water is generated by the chemical reaction between hydrogen and oxygen upon power generation. In addition, when power is generated in the fuel cell 10, unreacted hydrogen gas is discharged as off-gas.

The fuel cell 10 is connected to an upstream end of a hydrogen off-gas path 34. A downstream end of the hydrogen off-gas path 34 is connected to the gas-liquid separator 14. The hydrogen off-gas path 34 discharges the water generated in the fuel cell 10 to the gas-liquid separator 14. Further, the hydrogen off-gas path 34 discharges the off-gas (hydrogen gas) discharged from the fuel cell 10 to the gas-liquid separator 14.

The fuel cell 10 is further connected to an upstream end of an air off-gas path 38. A downstream end of the air off-gas path 38 is connected to an outlet for air (not shown). The air off-gas path 38 discharges the air discharged from the fuel cell 10 to the air outlet.

The gas-liquid separator 14 will be described. The gas-liquid separator 14 stores the water discharged through the hydrogen off-gas path 34. The gas-liquid separator 14 is connected to an air and water discharge path 40 and the circulation path 36, in addition to the hydrogen off-gas path 34. The gas-liquid separator 14 has its upper part connected with the hydrogen off-gas path 34 and the circulation path 36 and its bottom part connected with the air and water discharge path 40.

The air and water discharge path 40 is a path for discharging the water stored in the gas-liquid separator 14 outside. The air and water discharge path 40 has its downstream end connected to an outlet for water (not shown). The water is discharged from the gas-liquid separator 14 through the air and water discharge path 40. In the air and water discharge path 40, an air and water discharge valve 20 (example of a water discharge valve, hereafter "discharge valve 20") configured to open and close the air and water discharge path 40 is disposed. The discharge valve 20 is constituted of electromagnetic valve, for example. When the discharge valve 20 opens, water is discharged through the air and water discharge path 40.

The circulation path 36 has its upstream end connected to the gas-liquid separator 14 and its downstream end connected to the hydrogen supply path 30 via the ejector 16. The pressure of the hydrogen gas flowing in the hydrogen supply path 30 causes the off-gas (hydrogen gas) flowing in the circulation path 36 to be suctioned through the ejector 16 into the hydrogen supply path 30. Due to this, the off-gas is supplied to the hydrogen supply path 30 through the circulation path 36 from the gas-liquid separator 14. This off gas is supplied to the fuel cell 10 through the hydrogen supply path 30. Thus, the off-gas (hydrogen gas) discharged from the fuel cell 10 circulates and is supplied again to the fuel cell 10. In a variant, there may be a pump configured to deliver the off-gas by pressure to the circulation path 36.

The controller 50 of the fuel cell system 4 comprises a CPU, ROM, and/or RAM, and is configured to execute various controls and processes regarding the fuel cell system 4 in accordance with a predetermined program. The controller 50 is for example an engine control unit (ECU) of a vehicle.

Next, an open-close (open and control) control of the discharge valve 20 will be described. In the above-mentioned fuel cell system 4 (and the water discharge valve system 2), the controller 50 performs the open-close control of the discharge valve 20. The controller 50 starts the open-close control of the discharge valve 20 for example when an amount of stored water in the gas-liquid separator 14 exceeds a predetermined upper threshold. The amount of the stored water in the gas-liquid separator 14 is detected by a sensor (not shown) mounted in/on the gas-liquid separator 14. In a variant, the amount of the stored water in the gas-liquid separator 14 may be calculated based on an amount of electricity generated by the fuel cell 10.

Figure 2:
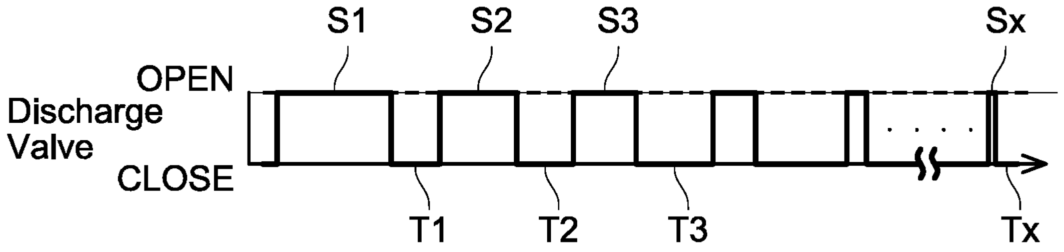
FIG. 2 illustrates a timing chart of open-close control according to the embodiment.

As shown in FIG. 2, the controller 50 intermittently opens and closes the discharge valve 20 in the open-close control of the discharge valve 20. When the controller 50 intermittently opens and closes the discharge valve 20, the controller 50 decreases a ratio of an valve-open duration of the discharge valve 20 to a valve-closed duration of the discharge valve 20 as time passes from a start of the open-close control. More specifically, as time passes from the start of the open-close control, the controller 50 shortens the valve-open duration of the discharge valve 20 and lengthens the valve-closed duration of the discharge valve 20.

Open-close control shown in FIG. 2 comprises a plurality of valve-opening steps S1, S2, . . . and a plurality of valve-closing steps T1, T2, . . . . Among the plurality of valve-opening steps S1, S2, . . . , the duration of the first valve-opening step S1 is the longest and the duration of the last valve-opening step Sx is the shortest. The duration of each of the valve-opening step S2 and the subsequent steps (i.e., S3 . . . ) is shorter than the duration of any of its preceding valve-opening step(s). In other words, the duration of a certain valve-opening step (e.g., S3) is shorter than the duration of the valve-opening step that precedes the certain step (e.g., S2).

Among the plurality of valve-closing steps T1, T2, . . . , the duration of the first valve-closing step T1 is the shortest, and the duration of the last valve-closing step Tx is the longest. The duration of each of the valve-closing step T2 and the subsequent steps (i.e., T3 . . . ) is longer than the duration of any of its preceding valve-closing step(s). In other words, the duration of a certain valve-closing step (e.g., T3) is longer than the duration of the valve-closing step that precedes the certain step (e.g., T2).

After the controller 50 has started the open-close control of the discharge valve 20, the controller 50 terminates the open-close control of the discharge valve 20 for example when the amount of the stored water in the gas-liquid separator 14 falls below a predetermined lower threshold.

(Effects)

The fuel cell system 4 and the water discharge valve system 2 according to the embodiment have been described. As is apparent from the above description, the water discharge valve system 2 of the embodiment comprises: the gas-liquid separator 14 configured to store water discharged from the fuel cell 10; and the discharge valve 20 configured to discharge the water stored in the gas-liquid separator 14 outside. The controller 50 intermittently opens and closes the discharge valve 20 such that a ratio of the valve-open duration to the valve-closed duration of the discharge valve 20 decreases as time passes from start of the open-close control.

In the configuration where the discharge valve 20 is intermittently opened and closed, the amount of the stored water decreases by the water stored in the gas-liquid separator 14 being discharged as time passes. According to the above configuration, as the amount of the stored water decreases, the ratio of the valve-open duration of the discharge valve 20 is reduced, as a result of which the valve-open duration does not become needlessly long, and thus the water stored in the gas-liquid separator 14 can be effectively discharged.

In the above configuration, as time passes from the start of the open-close control, the controller 50 shortens the valve-open duration of the discharge valve 20 and lengthens the valve-closed duration of the discharge valve 20. According to the above configuration, the ratio of the valve-open duration to the valve-closed duration of the discharge valve 20 can be reduced more. Also, the ratio of the valve-closed duration to the valve-open duration can be increased. Due to this, duration for water to be filled in the gas-liquid separator 14 can be ensured, which means that a great amount of water can be discharged at once, resulting in effective discharge of water. In addition, the increased valve-closed duration of the discharge valve 20 leads to decrease in an amount of leaking hydrogen through the discharge valve 20 and thus leads to improved fuel efficiency.

(Variants)

Figure 3:
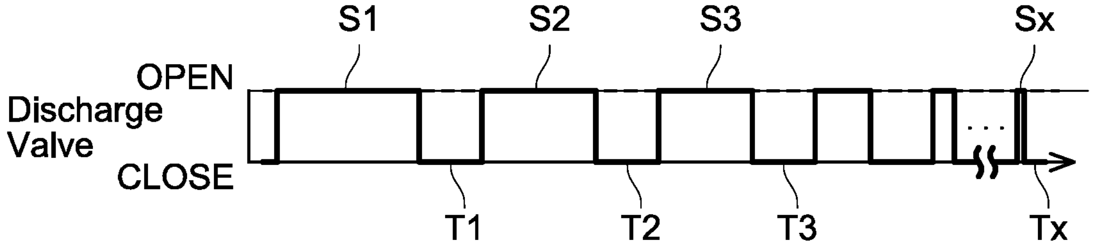
FIG. 3 illustrates a timing chart of open-close control according to a variant.

(1) The controller 50 may shorten the valve-open duration of the discharge valve 20 and maintain the valve-closed duration thereof constant as time passes from the start of the open-close control, as shown in FIG. 3. In the open-close control shown in FIG. 3, the duration of each of the plural valve-closing steps T1, T2, . . . is equal to each other. The others are the same as those relevant in the above embodiment. According to this configuration also, the ratio of the valve-open duration to the valve-closed duration of the discharge valve 20 can be made smaller as time passes from the start of the open-close control. Accordingly, the water stored in the gas-liquid separator 14 can be effectively discharged.

Figure 4:
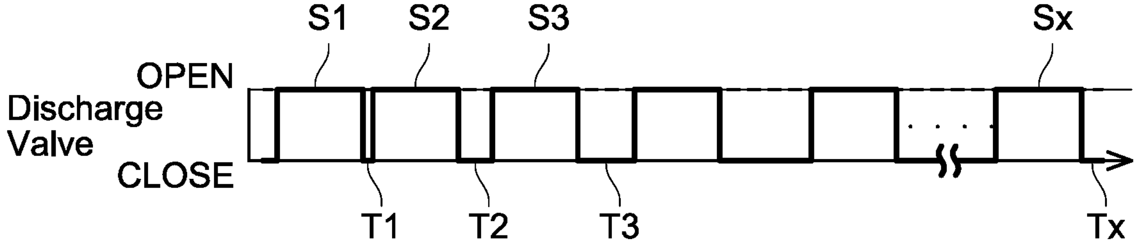
FIG. 4 illustrates a timing chart of open-close control according to a variant.

(2) The controller 50 may lengthen the valve-closed duration of the discharge valve 20 and maintain the valve-open duration thereof constant as time passes from the start of the open-close control, as shown in FIG. 4. In the open-close control shown in FIG. 4, the duration of each of the plural valve-opening steps S1, S2, . . . is equal to each other. The others are the same as those relevant in the above embodiments. According to this configuration also, the ratio of the valve-open duration to the valve-closed duration of the discharge valve 20 can be made smaller as time passes from the start of the open-close control. Accordingly, the water stored in the gas-liquid separator 14 can be effectively discharged. In addition, the increased valve-closed duration of the discharge valve 20 leads to decrease in an amount of leaking hydrogen through the discharge valve 20 and thus leads to improved fuel efficiency.

(3) The discharge valve 20 may be disposed at a connection between the gas-liquid separator 14 and the air and water discharge path 40 and thus may be integrated with the gas-liquid separator 14.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A water discharge valve system comprising:

a gas-liquid separator configured to store water discharged from a fuel cell;

a water discharge valve configured to discharge the water stored in the gas-liquid separator outside; and a controller configured to execute open-close control of the water discharge valve, wherein the controller intermittently opens and closes the water discharge valve and shortens the valve-open duration of the water discharge valve and lengthens the valve-closed duration of the water discharge valve such that a ratio of a valve-open duration to a valve-closed duration of the water discharge valve decreases as time passes from start of the open-close control.

2. A water discharge valve system comprising:

a gas-liquid separator configured to store water discharged from a fuel cell;

a water discharge valve configured to discharge the water stored in the gas-liquid separator outside; and a controller configured to execute open-close control of the water discharge valve, wherein the controller intermittently opens and closes the water discharge valve and shortens the valve-open duration of the water discharge valve and keeps the valve-closed duration of the water discharge valve constant such that a ratio of a valve-open duration to a valve-closed duration of the water discharge valve decreases as time passes from the start of the open-close control.

* * * * *